UNITED STATES PATENT OFFICE.

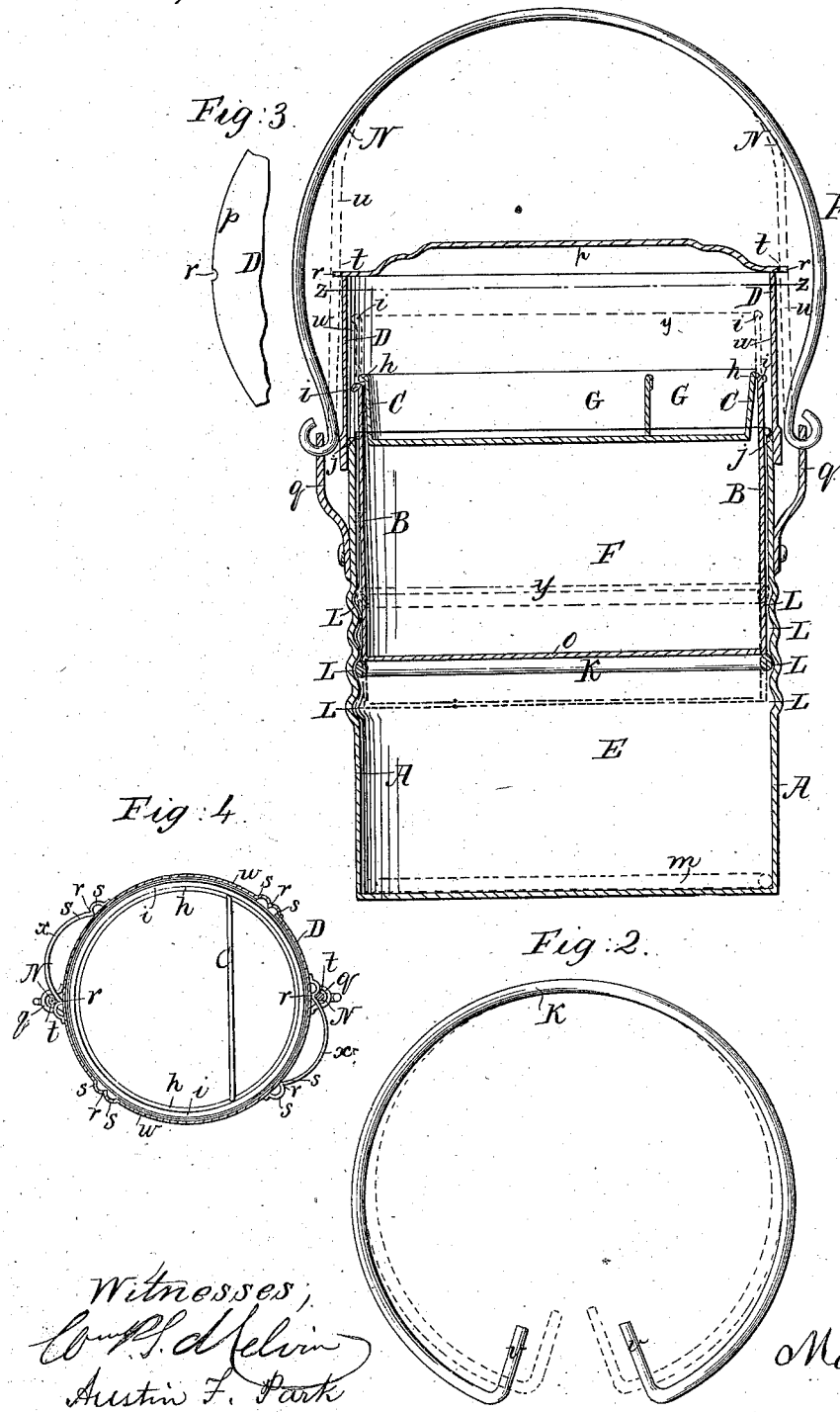

MORITZ SAULSON, OF TROY, NEW YORK.

Letters Patent No. 83,323, dated October 20, 1868.

---

IMPROVED DINNER-PAIL.

---

The Schedule referred to in these Letters Patent and making part of the same.

---

*To all whom it may concern:*

Be it known that I, MORITZ SAULSON, of the city of Troy, in the county of Rensselaer, and State of New York, have invented certain new and useful Improvements in Dinner-Pails, of which the following is a full and exact description, reference being had to the accompanying drawing, in which—

Figure 1 is a central sectional elevation of a dinner-pail;

Figures 2 and 3, plans of parts thereof; and

Figure 4, on a smaller scale, a horizontal section at, and plan of the parts below, the line $z\,z$, in fig. 1, of a modification of the same dinner-pail.

Like parts are marked by like letters in the various figures.

One part of my invention consists of a pail, A, having a removable inner vessel, B, inserted and supported in the upper portion of the pail, and an interior removable pan, C, inserted and supported in the upper part of the inner vessel, in combination with a removable cup-like cover, D, fitted over and around outside of the upper portion of the pail, pan, and inner vessel, all together, so as to form, in the lower part of the pail, a drink or food-chamber, E, covered by the inner vessel, B, and so as to leave, in the lower portion of the inner vessel, a food-chamber, F, covered by the pan C, and so as to form, in the pan and under the inverted cup or cover D, a chamber or chambers, G, for pie, cake, or delicacies, and so that the cup-like cover D, by shutting down outside of the pail, with the inner vessel, B, and pan C, inside, shall very effectually prevent rain and dust from beating, blowing, or falling into and injuring food in any of the chambers, E F G, whenever the dinner-pail shall be left out in a rain-storm, or by a dusty roadside, or in a dusty shop, factory, or foundry, as often happens; and so that the cup-like cover, D, pan C, inner vessel, B, and pail A, can all be freely taken apart, and each used as a separate vessel, for culinary and other purposes; and so that the pail can be freely used with only the inner vessel inserted, or with only the cover on, or with only the inner vessel and pan inserted together, or with only the cover on and the inner vessel alone inserted; and so that the inner vessel can be used with only the pan inserted, or with only the cover on, or with the cover on and the pan inserted. In carrying out this part of my invention, I support the pan C in the upper portion of the inner vessel, B, by any suitable means, as, for example, by having the outer diameter of the upper portion of the pan somewhat larger than the inner diameter of the upper part of the inner vessel, or by means of a narrow flange, $h$, on and around the top of the pan, and resting on the rim of the inner vessel, as shown in fig. 1; and I support the inner vessel, B, in the upper portion of the pail A, by any suitable devices, as, for example, by means of a narrow flange, $i$, formed on and around the top of the inner vessel, and resting, as indicated by blue lines in fig. 1, upon the rim, $j$, of the pail, or by making the upper portion of the inner vessel a little larger around than the inside of the upper part of the pail, or by means of the devices hereinafter described for the purpose.

Another part of my invention consists in supporting the vessel B in the upper part of the pail A, by having the bottom of the cup B rest on an outwardly-springing bent wire, K, fig. 2, resting in a bead or groove, L, formed and arranged in and around the body of the sheet-metal pail, essentially as indicated in fig. 1, so that the spring K can be freely sprung inward and taken out of the groove L, and removed from the pail, or put down on its bottom, as indicated by the dotted lines, at $m$, in fig. 1, and so that the cup B can be set in a lower position in the upper part of the pail A, by removing the spring K from the groove L, and having the top portion, or a flange, $i$, of the vessel B, rest directly on or against the top, $j$, of the pail, as indicated by the blue lines in fig. 1, or by having the bottom edge of the inner vessel, B, rest on the spring K, in another and lower groove, L, formed in and around the body of the pail, as will be apparent upon inspecting fig. 1, wherein the red lines $y$ indicate one position in which the vessel B may be supported in the pail A by means of the removable spring K and grooves L. I have the spring K commonly consist simply of a suitable piece of wire, bent into a circular form, with its ends turned inward, as at $v\,v$, fig. 2, so that a person can conveniently grasp them between a thumb and finger, and thereby contract the spring, and place it in and take it from the proper groove in the pail; and I commonly make the groove or grooves L in the form of ordinary bead-ornamentations, in the body of the pail, by passing the latter between beading-rollers, such as are commonly used by tin-workers.

Another part of my invention consists in keeping the cup-like cover D in its proper place, upon and around outside of the upper portion of the pail A, and also preventing the said combined pail and cover from swinging or tilting sideways in the pivoted bail N of the pail, when carried carelessly by the bail, however top-heavy they shall be, and however high or low the cover shall be placed on the pail, by having two diametrically-opposite notches, $r\,r$, in or upon the surrounding cover, B, and also having the bail N consist of an elastic rod or wire, so shaped and arranged that when the notches $r\,r$, of the cover on the pail, shall be opposite to the bail-ears $q\,q$, and the bail turned into its upright position, the bail will then spring into and remain in the said notches $r\,r$ of the cover D, and thereby secure the cover and pail together, and yet so that the bail may be easily sprung out of the notches $r\,r$, and turned down, so as to let the cover be taken off from the pail. In fig. 1, the dotted lines $u\,u$ indicate the proper position of the bail in respect to the notches $r\,r$ of the cover. I generally prefer to make the notches $r\,r$ in the projecting rim of the top, $p$, of the cover, as shown by figs. 1 and 3; but they may be made by striking or bending out projections, s s, s s, fig. 4, in the sides, w, of the cover, or on the ends of two opposite handles or knife and fork-holders, x x, thereon.

I am aware that some dinner-pails have been heretofore made with a cup or inner vessel supported by its rim, in the upper part of the pail, and that others have had two or more cups or pans, arranged, one above and partly within another, and that pails have been made with covers shutting down around outside of the upper part of the pail; but I do not know or believe that the pail A, inner vessel B, pan C, and outside cup-like cover D, have all four been heretofore arranged in combination, so as to form the three distinct food-chambers, E, F, and G, all effectually protected against rain and dust beating in, by the outside surrounding cover D, as hereinbefore particularly described.

I am also aware that sheet-metal dinner-pails, having a cup-like vessel in the upper part, are commonly stiffened and ornamented by beads or grooves formed in and around the body of the pail, and that a circularly-bent wire spring is not new; but I am not aware that a removable wire spring was ever before used in combination with a suitably-arranged groove or grooves in the body of the pail, and a suitably-constructed inner vessel B, so as to support the latter in the upper part of the pail, and, when removed, allow the inner vessel to be set at a different height in the pail, as hereinbefore particularly described.

And I know that a pail having a hinged bail of wire, and a cover shutting down around the outside of the upper part of the pail, is not new, and that vessels have been made with hinged bails, which, when turned into the upright position, would engage with the vessels, so as to prevent the latter from tilting when carried by the bail; but I believe the combination of a pail having a hinged, wire-like spring-bail, with a freely-removable cup-like cover, setting down around outside of the upper part of the pail, and having diametrically-opposite notches, into which the said bail will spring and remain, when turned into the upright position, however high or low the cover shall be placed on the pail, and thereby not only keep the outside cover on the pail, but also prevent the pail from swinging or tilting in the bail, as hereinbefore described, is new.

What I claim as my invention, and desire to secure by Letters Patent, is—

The combination of the pail A, inner vessel, B, arranged in the upper part of the pail, pan C, in the upper part of the inner vessel, and cover D, extended down outside of the pan, inner vessel, and pail, as herein described.

Also, the combination, with the pail A and inner vessel, B, of the removable wire spring K and groove or grooves L, formed and arranged substantially as and for the purpose herein set forth.

Also, the combination, with the pail A and outside surrounding cover D, of the notches r r and wire-like spring-bail N u, formed and arranged substantially as and for the purposes herein shown and described.

In testimony whereof, I hereunto set my hand, this 25th day of May, 1868.

MORITZ SAULSON.

Witnesses:
WM. P. S. MELVIN,
AUSTIN F. PARK.